United States Patent
Hall et al.

[11] Patent Number: 5,822,398
[45] Date of Patent: Oct. 13, 1998

[54] CONTROL OF OPERATING STATES OF CHANNEL UNIT INSTALLED IN PERFORMANCE MONITORING CAPABLE D4 CHANNEL BANK

[75] Inventors: Clifford L. Hall, Brownsboro; Wade S. Schofield, Huntsville, both of Ala.

[73] Assignee: Adtran, Inc., Huntsville, Ala.

[21] Appl. No.: 558,085

[22] Filed: Nov. 13, 1995

Related U.S. Application Data

[63] Continuation-in-part of Ser. No. 404,288, Mar. 14, 1995, which is a continuation-in-part of Ser. No. 27,948, Mar. 8, 1993, Pat. No. 5,473,665.

[51] Int. Cl.$^6$ .............................. H04M 1/24; H04M 3/08; H04M 3/22
[52] U.S. Cl. ................................. 379/29; 379/5; 379/15; 379/27; 379/28; 370/514
[58] Field of Search ............................ 379/5, 15, 27–29; 370/514

[56] References Cited

U.S. PATENT DOCUMENTS

| | | | |
|---|---|---|---|
| 5,390,179 | 2/1995 | Killian et al. | 370/68.1 |
| 5,473,665 | 12/1995 | Hall et al. | 379/29 |
| 5,574,723 | 11/1996 | Killian et al. | 370/68.1 |

Primary Examiner—Curtis Kuntz
Assistant Examiner—Duc Nguyen
Attorney, Agent, or Firm—Charles E. Wands

[57] ABSTRACT

A performance monitoring arrangement conducts auxiliary communications between a performance-monitoring capable line interface unit and one or more performance-monitoring capable channel units of a D4 channel bank without interrupting transmission of digital data to and from a customer premises. During each of an initialization mode and a performance-monitoring mode, the data communication format of a channel bank bus is modified to allow insertion of an auxiliary line interface unit-sourced command bit between selected bits of the data. During the performance-monitoring mode, the communication format of the channel bank link is further modified to provide for insertion of a response bit from a channel unit and the transmission of data at an increased data rate. In the absence of an indication that there is an anomaly that would impair the operation of the channel bank, the channel unit transitions to a performance-monitoring mode of operation. If either of the channel unit and line interface unit is not capable of conducting performance-monitoring communications with one another, and in the absence of an indication that there is an anomaly that would impair the operation of the channel bank, the channel unit transitions from the initialization state to a normal mode of operation.

33 Claims, 7 Drawing Sheets

INIT REQUEST

| 1234 5678 | DESCRIPTION |
|---|---|
| 0001 1000 | UNASSIGNED MULTIPLEX CODE |
| 0001 1000 | UNASSIGNED MULTIPLEX CODE |
| 0001 1000 | UNASSIGNED MULTIPLEX CODE |
| 0111 1110 | CONTROL MODE IDLE |
| 0111 1110 | CONTROL MODE IDLE |

*FIG. 6*

INIT COMMAND

| 7654 3210 | DESCRIPTION |
|---|---|
|  | (10 BIT TIMES OF STOP BITS) |
| 1111 0000 | (MESSAGE DELIMITER) |
| 1100 0001 | CONTROL FIELD/COMMAND OPCODE |
| (x31)...(x24) | THE 'x' BITS TO ECHO IN THE INIT RESPONSE MESSAGE |
| (x23)...(x16) |  |
| (x15)...(x8) |  |
| (x7)...(x0) |  |
| CCCC CCCC | LOW HDLC CRC BYTE |
| CCCC CCCC | HIGH HDLC CRC BYTE |
|  | (MESSAGE DELIMITER) |

*FIG. 7*

TIME SYNC COMMAND

| 7654 3210 | DESCRIPTION |
|---|---|
|  | (MESSAGE DELIMITER FROM PREVIOUS MESSAGE) |
| 1100 0110 | CONTROL FIELD/COMMAND OPCODE |
| SSSS SSSS | CURRENT SECOND (0..255), ALWAYS |
| CCCC CCCC | LOW HDLC CRC BYTE |
| CCCC CCCC | HIGH HDLC CRC BYTE |
|  | (MESSAGE DELIMITER) |

*FIG. 13*

INIT RESPONSE

| 1 | 234 5678 | DESCRIPTION |
|---|---|---|
| (x31) | 001 1000 | UNASSIGNED MULTIPLEX CODE |
| (x30) | 001 1000 | UNASSIGNED MULTIPLEX CODE |
| (x29) | 001 1000 | UNASSIGNED MULTIPLEX CODE |
| (x28) | 001 1000 | UNASSIGNED MULTIPLEX CODE |
| (x27) | 001 1000 | UNASSIGNED MULTIPLEX CODE |
| (x26) | 001 1000 | UNASSIGNED MULTIPLEX CODE |
| (x25) | 001 1000 | UNASSIGNED MULTIPLEX CODE |
| (x24) | 001 1000 | UNASSIGNED MULTIPLEX CODE |
| (x23) | 001 1000 | UNASSIGNED MULTIPLEX CODE |
| (x22) | 001 1000 | UNASSIGNED MULTIPLEX CODE |
| (x21) | 001 1000 | UNASSIGNED MULTIPLEX CODE |
| (x20) | 001 1000 | UNASSIGNED MULTIPLEX CODE |
| (x19) | 001 1000 | UNASSIGNED MULTIPLEX CODE |
| (x18) | 001 1000 | UNASSIGNED MULTIPLEX CODE |
| (x17) | 001 1000 | UNASSIGNED MULTIPLEX CODE |
| (x16) | 001 1000 | UNASSIGNED MULTIPLEX CODE |
| (x15) | 001 1000 | UNASSIGNED MULTIPLEX CODE |
| (x14) | 001 1000 | UNASSIGNED MULTIPLEX CODE |
| (x13) | 001 1000 | UNASSIGNED MULTIPLEX CODE |
| (x12) | 001 1000 | UNASSIGNED MULTIPLEX CODE |
| (x11) | 001 1000 | UNASSIGNED MULTIPLEX CODE |
| (x10) | 001 1000 | UNASSIGNED MULTIPLEX CODE |
| (x9) | 001 1000 | UNASSIGNED MULTIPLEX CODE |
| (x8) | 001 1000 | UNASSIGNED MULTIPLEX CODE |
| (x7) | 001 1000 | UNASSIGNED MULTIPLEX CODE |
| (x6) | 001 1000 | UNASSIGNED MULTIPLEX CODE |
| (x5) | 001 1000 | UNASSIGNED MULTIPLEX CODE |
| (x4) | 001 1000 | UNASSIGNED MULTIPLEX CODE |
| (x3) | 001 1000 | UNASSIGNED MULTIPLEX CODE |
| (x2) | 001 1000 | UNASSIGNED MULTIPLEX CODE |
| (x1) | 001 1000 | UNASSIGNED MULTIPLEX CODE |
| (x0) | 001 1000 | UNASSIGNED MULTIPLEX CODE |

*FIG. 8*

ENTER PM SMART

| 7654 3210 | DESCRIPTION |
|---|---|
|  | (MESSAGE DELIMITER FROM PREVIOUS MESSAGE) |
| 1100 0010 | CONTROL FIELD/COMMAND OPCODE |
| 0010 0000 | LOW HDLC CRC BYTE |
| 0100 0010 | HIGH HDLC CRC BYTE |
|  | (MESSAGE DELIMITER) |

*FIG. 9*

ACK RESPONSE

| 7654 3210 | DESCRIPTION OF RESPONSE STATUS BYTE VALUES |
|---|---|
|  | (MESSAGE DELIMITER FROM PREVIOUS MESSAGE) |
| 1000 0000 | CONTROL FIELD/COMMAND OPCODE |
| CCCC CCCC | LOW HDLC CRC BYTE |
| CCCC CCCC | HIGH HDLC CRC BYTE |
|  | (MESSAGE DELIMITER) |

*FIG. 10*

EXIT PM SMART

| 7654 3210 | DESCRIPTION |
|---|---|
|  | (MESSAGE DELIMITER FROM PREVIOUS MESSAGE) |
| 1100 0011 | CONTROL FIELD/COMMAND OPCODE |
| CCCC CCCC | LOW HDLC CRC BYTE |
| CCCC CCCC | HIGH HDLC CRC BYTE |
|  | (MESSAGE DELIMITER) |

| LOGICAL VALUE<br>7654 3210 | PHYSICAL SEQUENCE<br>7654 3210 |
|---|---|
| (MESSAGE DELIMITER) | 1111 0000 |
| 1111 00000 | 1111 0001<br>0000 0000 |
| 1111 0001 | 1111 0001<br>0000 0001 |

CONTROL OF OPERATING STATES OF CHANNEL UNIT INSTALLED IN PERFORMANCE MONITORING CAPABLE D4 CHANNEL BANK

CROSS-REFERENCE TO RELATED APPLICATIONS

The present application is a continuation-in-part of co-pending application Ser. No. 08/404,288 (hereinafter referenced as the '288 application), filed Mar. 14, 1995, by Clifford Hall et al, entitled: "D4 Channel Bank with Multi-Mode Formatted, Performance Monitoring Communications Bus," assigned to the assignee of the present application, which is a continuation-in-part of co-pending application Ser. No. 08/027,948 (hereinafter referenced as the '948 application), filed Mar. 8, 1993, by Clifford Hall et al, entitled: "Performance Monitoring of DS0 Channel Via D4 Channel Bank," now U.S. Pat. No. 5,473,665, issued Dec. 5, 1995 also assigned to the assignee of the present application, and the disclosures of each of which '288 and '948 applications are herein incorporated.

FIELD OF THE INVENTION

The present invention relates in general to telephone communication systems, and is particularly directed to a mechanism for controlling the initialization and performance monitoring modes of operation of an enhanced D4 channel bank, which has been modified to provide DS0 loop performance monitoring capability by means of an over-speeded bidirectional tri-stated intrabank communications bus, thereby facilitating the use of asynchronous-based communications to enable a control site to perform prescribed network supervisory tasks with respect to one or more selected DS0 loops served by the channel bank.

BACKGROUND OF THE INVENTION

As described in each of the above-referenced '948 and '288 applications, in spite of the fact that telecommunication equipment manufacturers currently offer a wide variety of digital communication products that are designed to improve system performance and service to the customer, the established telephone companies (regional Bell operating companies or RBOCs) have been reluctant to upgrade or replace their copper wire-based analog equipment to include the use of digital signalling subsystems and communication schemes. Faced with an ever growing customer demand, however, the telco's now at least offer leased-line digital services to sophisticated digital services customers. These customers maintain their digital communication networks with intelligent management systems that provide detailed information regarding the quality of the service being delivered. This information enables the customer to develop long term statistics for error-free seconds, severely errored seconds, as well as channel availability—namely, quantitative measures of the quality of service being leased.

Unfortunately, the network topographies and operating schemes currently embedded in an RBOC's network do not provide adequate information about the performance of the digital service over metallic loops installed between the serving central office and the network interface at the customer's premises. As a consequence, an RBOC is not readily prepared to address a customer's complaint that published digital services specifications are not being fulfilled. In addition, the local telephone companies also lack information necessary to observe the success of their own objectives toward delivering such digital services and a means to rapidly detect and respond to an outage or degradation in service.

Because of these shortcomings, the RBOCs (and the telco's in general) have sought to upgrade the diagnostic tools used for their digital carrier links, in order to enable them to monitor the performance of their metallic loops. Although complete system replacement is one straightforward approach, the service providers generally prefer add-ons or enhancements to already installed systems, thereby allowing the bulk of the existing equipment to be preserved and minimizing service interruption when upgrading the network.

Figure 1:
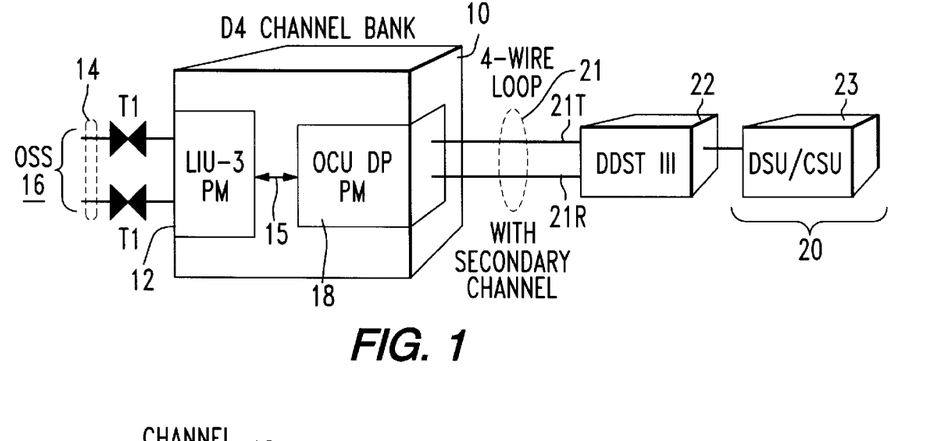
FIG. 1 diagrammatically illustrates an AT&T-compatible D4 channel bank installed in a typical digital carrier telephone network, through which digital services may be provided by the network to digital signalling equipment located at a customer's premises.

Advantageously, the invention described in the above-referenced '948 application accommodates this preference of service providers, by upgrading the office channel unit (OCU) and line interface unit (LIU) components of an existing D4 channel bank, such as that diagrammatically illustrated at 10 in FIG. 1, so that the channel bank's internal communications link 15 may be controllably tri-stated to provide bidirectional signalling capability between the LIU 12 and a channel unit 18. The bidirectional signalling format on the controllably tri-stated portion of intra channel bank link 15 is defined to support both the transmission of incoming (received DS1 signalling traffic on a T1 link 14) from the LIU 12 to a channel unit 18, and the exchange of performance-monitoring command and response messages related to the operation of a (four-wire) DS0 loop 21, in a manner that is transparent to digital signalling equipment 23 located at a customer's premises 20.

In addition, each of the channel unit 18 and a digital data services network termination (DDST) 22 serving the customer's premises 20 is augmented by means of a performance monitoring scheme that allows at least one prescribed performance aspect of the DS0 channel 21 to be monitored, in each of the channel unit-to-DDST direction and the DDST-to-channel unit direction, with DS0 channel quality-representative messages being forwarded to the LIU 12 via the bidirectional portion of link 15.

For this purpose, within a channel unit 18 of the D4 bank 10, one or more prescribed performance aspects of the DS0 loop 21 are monitored, and information representative of each monitored performance aspect is stored. In response to a command message on link 15 from LIU 12, a reply message containing stored DS0 channel performance information is assembled and clocked onto link 15, so that it may be captured by the LIU 12 and reported to a supervisory operational support system (OSS) 16 located remotely with respect to the channel bank 10.

Figure 2:
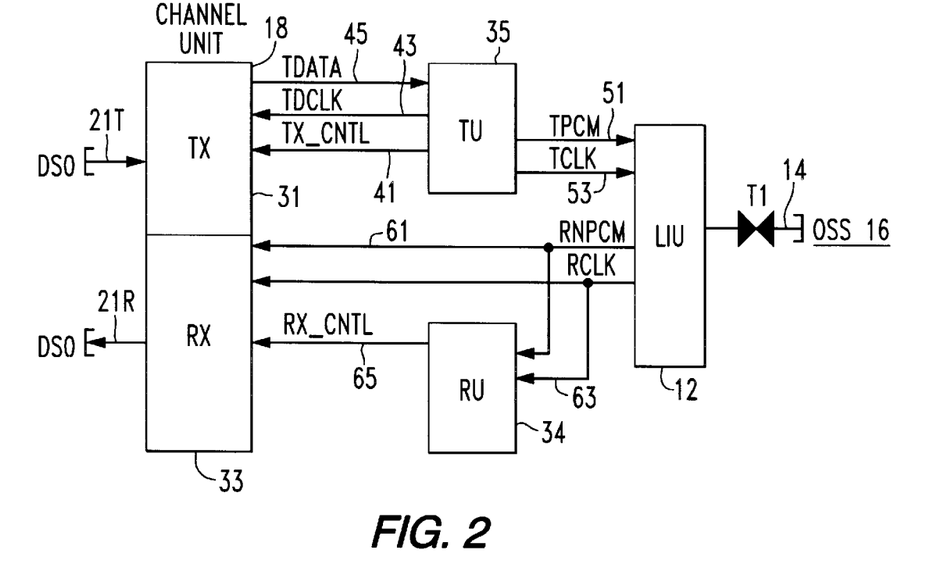
FIG. 2 diagrammatically shows the manner in which a line interface unit and an office channel unit data port of a D4 channel bank communicate with one another by way of an intrabank PCM communications link.

The manner in which the LIU 12 and channel unit 18 of D4 channel bank 10 communicate with one another by way of the tri-stated portion of PCM communications link 15 is diagrammatically shown FIG. 2. The channel unit has a transmitter section 31, to which DS0 data from the four wire metallic loop 21 is supplied from termination equipment at the customer premises 20, and a receiver section 33, from which DS0 data is coupled to four wire metallic loop 21 for delivery to the customer site termination equipment at customer premises 20. The transmitter section 31 is coupled via a set of transmission leads 41, 43 and 45 to a transmit unit 35.

Lead 45 is employed as a transmit data (TDATA) bus for carrying serialized data bits from the transmitter section 31 of the channel unit 18 to transmit unit 35. Link 41 contains a set of transmit sequence control leads on which transmission control TX_CNTL signals from the transmit unit 35 are asserted for controlling the format of data transmissions from the channel unit 18 on the TDATA lead 45. Lead 43 is a clock lead on which a transmit clock signal TDCLK is asserted by transmitter section 31.

In response to the control and clock signals on leads 41 and 43, the transmitter section 31 of channel unit 18 decodes its respective channel select strobe and transmits data packets onto transmit data TDATA bus 45 in a respective one of a plurality (e.g. 24) multiplexed channel unit time slots of a multi-channel (e.g. 24 channel) unit digroup within the D4 bank. Pursuant to industry (AT&T-defined) communication standards, the channel select strobe occurs at an 8 KHz rate, so that with an eight bit byte being asserted for each strobe, a 64 Kb/s (DS0) channel is provided for a DS1 line. As data is serialized out over the TDATA bus 45, transmit unit 35 collects the 192 (8 bits from each of the (24) channel units), appends a framing bit, and outputs the resulting DS1-formatted PCM data stream onto TPCM link 51, and an associated transmit clock signal via TCLK link 53 to the LIU 12. The LIU 12 couples the formatted DS1 data onto the digital carrier for transmission over T1 link 14.

On the DS1 receive side, incoming T1 carrier signals from link 14 are received by the LIU 12, and extended superframe format is converted into superframe formatted signals, as necessary. Payload or signalling bits are not altered. The DS1 data is asserted onto a receive RNPCM bus 61, which is coupled to receive unit 34 and to the receiver section 33 of each channel unit 18 of the D4 bank. The DS1 clock within the T1 data is recovered by LIU 12 and applied as a recovered clock signal on RCLK link 63, which is also coupled to receive unit 34 and to the receiver section 33 of each channel unit 18.

Figure 3:
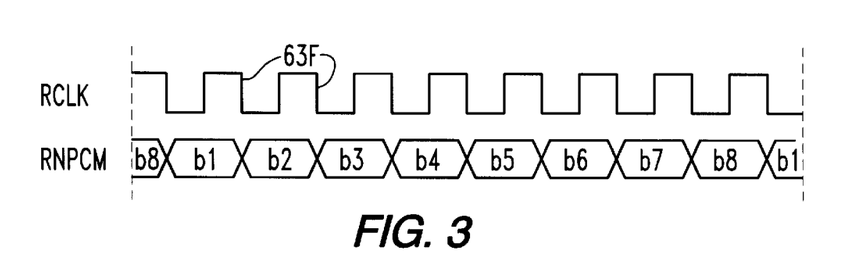
FIG. 3 diagrammatically illustrates the format of data strobes asserted onto the RNPCM bus.

FIG. 3 diagrammatically illustrates the format of data strobes asserted onto the RNPCM bus 61 as sequential information bits bi (eight bits b1–b8 per channel i) by the LIU 12, coincident with the falling edges 63F of the recovered clock RCLK signals, thereby allowing for a one-half bit time of set-up and one-half bit time of hold. The receive unit 34 synchronizes its timing with the DS1 framing pattern of the received signal and supplies channel unit control signals over RX_CNTL link 65 to the receiver section 33 of each channel unit in the D4 bank 10. This allows each channel unit 18 to decode its channel select strobe for the received data and to extract its corresponding byte of data from the associated time slot of RNPCM data bus 61.

In the D4 channel bank configuration of FIG. 2, all channel units in the D4 channel bank share the transmit and receive data buses 45 and 61, respectively, so that each channel unit has physical access to every DS0 time slot in a digroup. Time slot allotment is multiplexed in accordance with control and clock signals supplied by the transmit unit 35 for the transmit direction and by the receive unit 34 for the receive direction.

Figure 4:
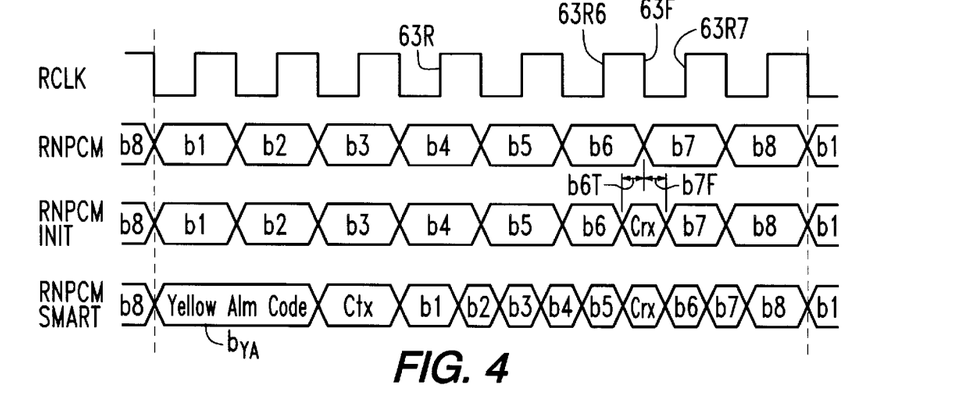
FIG. 4 diagrammatically illustrates the manner in which the data strobes of FIG. 3 are modified to provide a simplified data format for enhanced, performance monitoring bidirectional signalling.

Now, although the 'user-transparent' performance monitoring and reporting scheme described in the '948 application offers a significant improvement over conventional D4 channel bank equipment (which provide no subscriber-transparent performance monitoring and reporting mechanism of any kind), the invention detailed in the above-referenced '288 application provides an enhancement of this scheme that modifies the signalling format employed for bidirectional signalling over the channel bank's RNPCM bus in the manner shown in FIG. 4, so as to provide for the use of asynchronous-based communication circuitry in the line interface unit 12 and channel unit 18.

In FIG. 4, the modified data format labelled as RNPCM INIT is used during an initialization (INIT) mode of operation of a channel bank that has been upgraded to convey performance monitoring command messages from an enhanced or 'smart' LIU to an enhanced or 'smart' channel unit. The RNPCM INIT data format is essentially identical to the normal RNPCM bus format, with the exception that it provides for the insertion of an auxiliary command or Crx bit between the b6 and b7 bits. This additional Crx bit is employed by a smart line interface unit (SMART LIU) to transmit command information to a SMART channel unit. The RNPCM SMART format is used during a SMART mode of operation of an upgraded channel bank to convey command messages from an upgraded, performance monitoring-capable, SMART LIU to an upgraded, performance monitoring-capable SMART channel unit, as well as to convey response messages from a SMART channel unit to the SMART LIU.

The RNPCM SMART format effectively overspeeds the RNPCM bus by using a rate-doubled receive clock signal to compress the duration of each of the data bits b1–b8 of a data byte to a time interval on the order of one-half that of the normal bit duration, and provides for the insertion of three additional information bits within the remaining available portion of the normal (eight bit) data byte period. The first two 'normal' duration data bits b1 and b2 are replaced by a single bit $b_{YA}$ associated with a 'yellow alarm' code, which is asserted on the RNPCM bus by a SMART LIU, when the SMART LIU has determined that a true yellow alarm condition exists.

Immediately following the 'yellow alarm' bit $b_{YA}$ is a Ctx bit, which replaces the third bit—b3 of a normal data format, and is employed by a SMART channel unit to transmit response information to a command message from a SMART LIU. A response message defined by the Ctx bit has the same format as the auxiliary Crx command bit. Following the Ctx bit are the compressed data bits b1–b8 and the interleaved Crx bit of the overspeeded RNPCM bus. As detailed in the '288 application, a SMART LIU employs the same signalling, timing and control components as a conventional non-performance monitoring capable line interface unit, plus additional circuitry and control software which effectively converts a conventional line interface unit into a SMART LIU.

Figure 5:
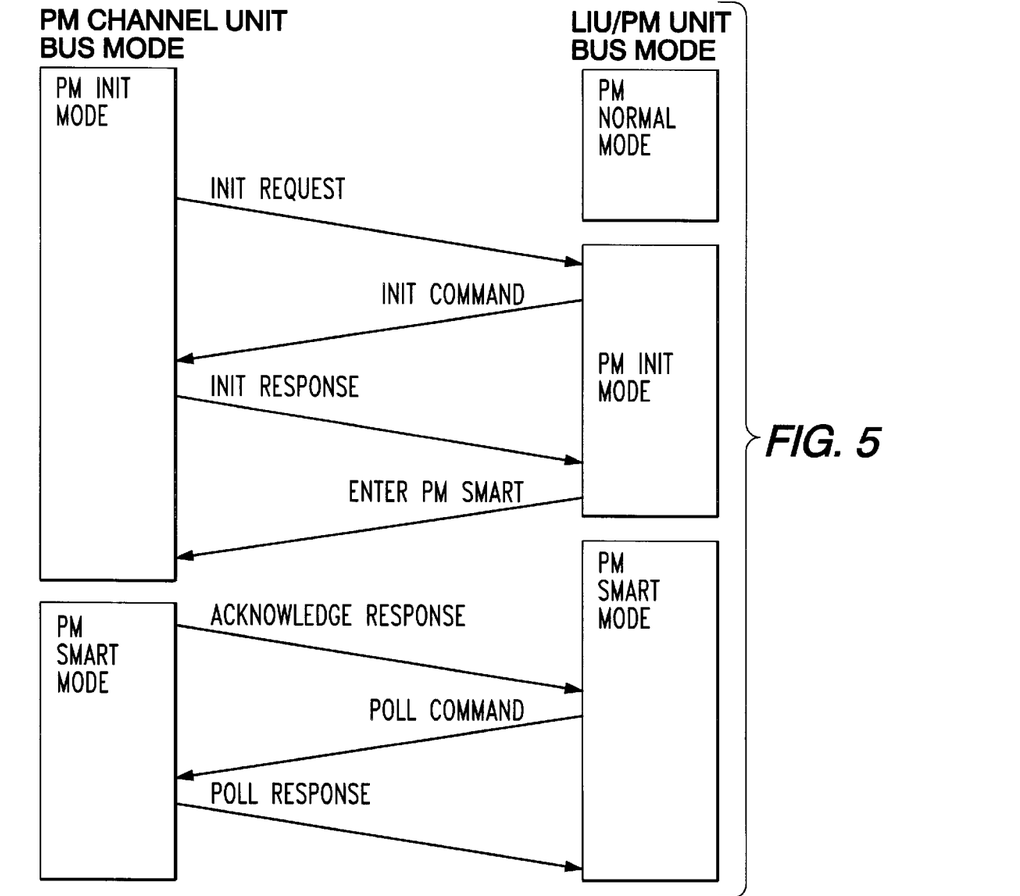
FIG. 5 is a mode establishment diagram showing the sequence of initialization and performance monitoring message exchanges between a performance monitoring-capable channel unit and a performance monitoring-capable line interface unit.
Figure 6:
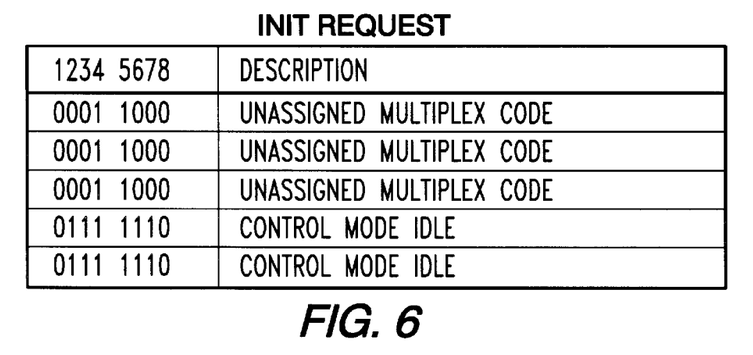
FIG. 6 shows the format of an INIT REQUEST message.

The operation of a SMART, performance monitoring-capable channel bank (namely a channel bank containing both a SMART LIU and a SMART channel unit) proceeds as diagrammatically illustrated in FIG. 5. Upon installation of a SMART channel unit in D4 channel bank 10, the SMART channel unit executes a sequence of initialization mode operations within a performance monitoring initialization mode PM INIT MODE. In this mode, during a prescribed time-out period, the SMART channel unit repeatedly transmits an initialization request INIT REQUEST message (the format of which is illustrated in FIG. 6) over the TDATA bus 45 of the intrabank link 15 to what it thinks is a performance monitoring-capable SMART LIU 12. In the absence of a response (from a SMART LIU) on the tri-stated RNPCM bus 61 of intrabank link 15 prior to the end of this time out period, the transmission of the INIT REQUEST message is terminated, so as to prevent a SMART channel unit from continuously attempting to request initialization from a non-smart LIU. While in this PM INIT MODE, the SMART channel unit disables transmission to the local DS0 loop 21.

Figure 7:
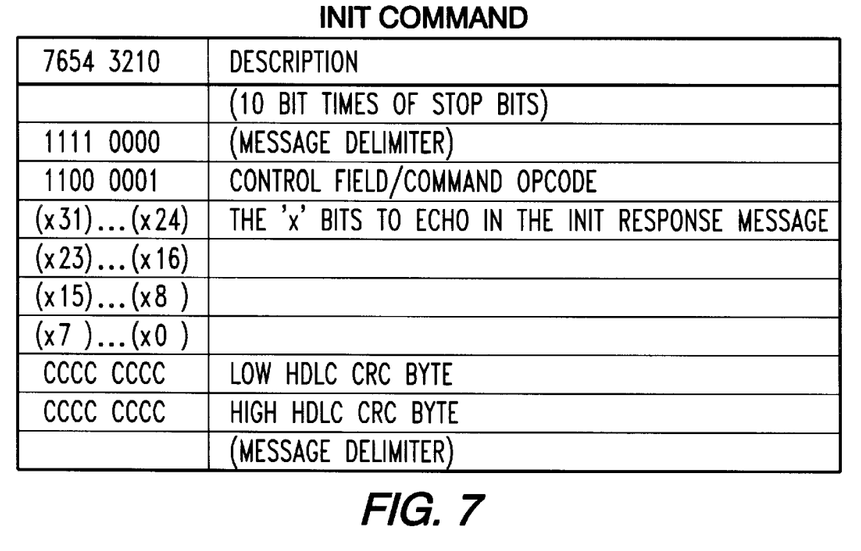
FIG. 7 shows the format of an INIT COMMAND message.

The transmit unit of the common equipment couples the initialization message to the SMART LIU 12, and the SMART LIU continuously scans successive timeslots associated with channel units of a digroup for the in-band INIT REQUEST message being transmitted by a SMART channel unit. During the PM INIT MODE, in response to detecting an INIT REQUEST message for a respective timeslot, the SMART LIU modifies the normal data format for that timeslot to the RNPCM INIT format of FIG. 4, and uses the Crx bit position to transmit an initialization command INIT COMMAND data packet (the format of which is shown in FIG. 7) on the RNPCM bus portion of the intrabank link 15 back to the SMART channel unit that has sourced the INIT REQUEST message.

Figure 8:
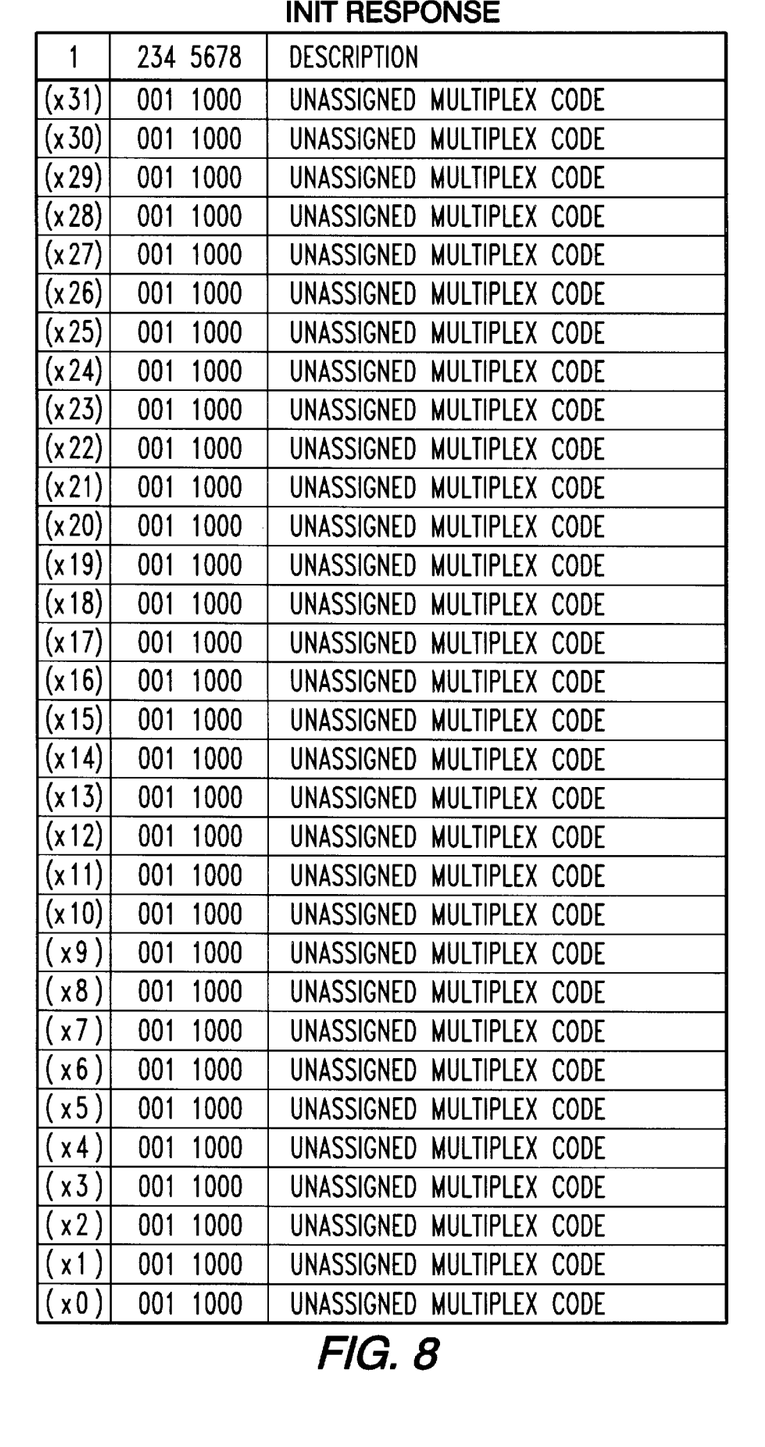
FIG. 8 shows the format of an INIT RESPONSE message.

After it has asserted an INIT REQUEST message on the TDATA lead, the SMART channel unit monitors the RNPCM bus and samples the Crx bit position of the RNPCM INIT format of the bus for the return of the INIT COMMAND message from the SMART LIU. Upon receipt of the INIT COMMAND message from the LIU, the SMART channel unit asserts an initialization response INIT RESPONSE message (the format of which is shown in FIG. 8) onto the TDATA bus portion of the intrabank link 15. The INIT RESPONSE message corresponds to the same byte information field contained within the INIT COMMAND message transmitted by the SMART LIU, so that the SMART LIU may verify that the destination channel unit is co-located in the same SMART D4 channel bank as the SMART LIU. The SMART channel unit continues to repeatedly assert the INIT RESPONSE information field onto the TDATA bus for a prescribed time interval or until in receives an ENTER RNPCM SMART mode command message from the SMART LIU.

Figure 9:
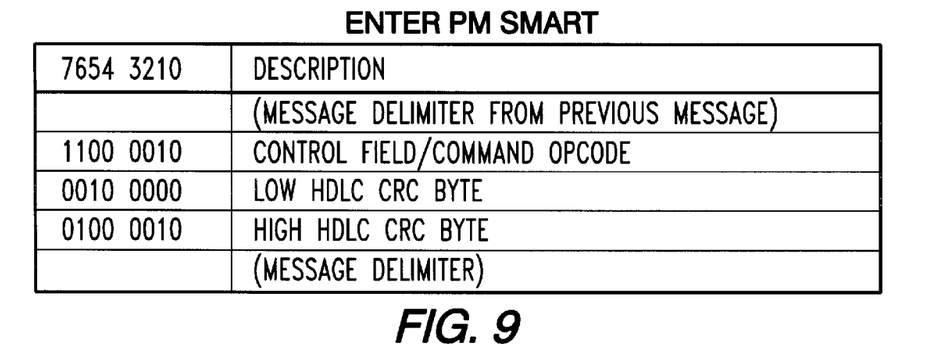
FIG. 9 shows the format of the ENTER PM SMART message.

After asserting an INIT COMMAND message on the RNPCM bus, the SMART LIU monitors the TPCM lead from the transmit unit of the common equipment for an INIT RESPONSE message that has been asserted onto the TDATA bus by the SMART channel unit. If the INIT RESPONSE message is not detected within a prescribed time interval after it has transmitted the INIT COMMAND message, the SMART LIU infers that the channel unit is not a SMART channel unit and proceeds to configure the timeslot of interest to normal RNPCM mode and scans the next timeslot. If the proper INIT RESPONSE message has been returned by the SMART channel unit, the SMART LIU configures its data multiplexer for the RNPCM SMART mode, and asserts an ENTER PM SMART mode command message (the format of which is shown in FIG. 9) onto the RNPCM bus portion of the intrabank link 15.

Figure 10:
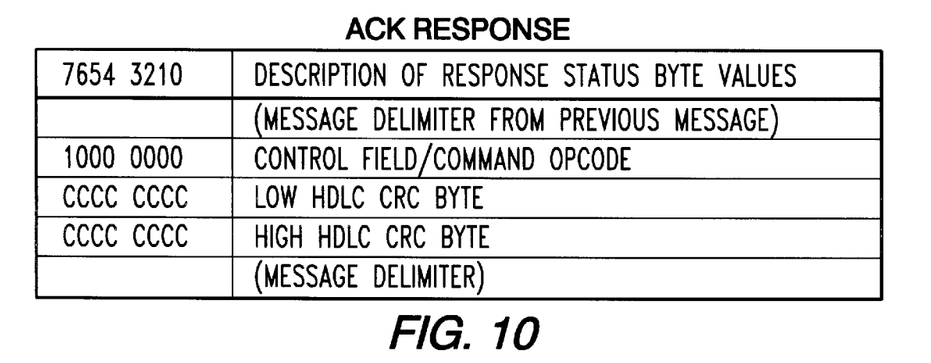
FIG. 10 shows the format of an ACKNOWLEDGE RESPONSE message.

In response to asserting an INIT RESPONSE message to the SMART LIU on the TDATA lead portion of the intrabank link 15, the SMART channel unit monitors the RNPCM bus 61 and samples the Crx bit position of the RNPCM INIT format of the bus shown in FIG. 4 for the return of the ENTER PM SMART message from the SMART LIU. Upon receipt of the ENTER PM SMART command message from the SMART LIU, the SMART channel unit transitions to the PM SMART MODE. When transitioning to this PM SMART MODE, the SMART channel unit proceeds to reconfigure the TDATA bus portion of the intrabank link 15 for the normal data format shown in FIG. 4, and also asserts an acknowledge message ACKNOWLEDGE RESPONSE (the format of which is shown in FIG. 10) onto the RNPCM bus portion of the intrabank link 15, using the bit position customarily occupied by the b3 bit of a normal data format to assert a Ctx bit, as described above. Once the channel detects an ACKNOWLEDGE RESPONSE on the RNPCM bus 61, which verifies that both the LIU and the channel unit are configured for SMART mode POLL COMMAND and POLL RESPONSE message exchanges, the SMART LIU proceeds to conduct asynchronous command and response message communications with the SMART channel unit.

Now although the SMART MODE message exchange format shown in FIG. 5 serves to both initialize a SMART channel unit and allow it to conduct performance monitoring communications with a SMART LIU, there are a number of circumstances which may differ from the ideal situation of having both a SMART channel unit and a SMART LIU operating in the manner described above. Non-limiting examples of such circumstances include installing a SMART channel unit in channel bank not having an installed SMART LIU, installing a SMART channel unit in channel bank having a SMART LIU, and then replacing the SMART LIU with a non-smart LIU, replacing a SMART channel unit with a non-smart channel unit, and the occurrence of an anomaly which disables either or both of the SMART channel unit and the SMART LIU.

SUMMARY OF THE INVENTION

In accordance with the present invention, the communications control software employed in the upgraded channel bank architecture described in the above-referenced '288 application is configured to execute a channel unit state transition diagram, through which a supervisory performance monitoring controller SMART LIU selectively places the intrabank communications link in a SMART MODE communication status and, once the SMART MODE has been established, exchanges DS0 loop-performance command and response messages with SMART channel units on a selective basis. The circuitry of each the SMART LIU and A SMART channel unit architectures remains as shown and described in the above-referenced '288 application.

Pursuant to the initialization and performance monitoring mode control mechanism of the present invention, the first or initial state in which a performance monitoring-capable or SMART channel unit is placed is a continuous initialization condition. When entering this state, the channel unit transmits an INIT REQUEST message to the LIU. The channel unit backplane includes a disable lead which, when asserted active, in the event of a bank anomaly such as a momentary power disruption, disables the operation of a channel unit. When fault condition clears, the LIU changes the state of the disable lead, so as to allow the bank's channel units to resume operation. When the disable lead is de-asserted, the channel unit transitions from the continuous initialization state S1 to a performance monitoring decision state S2. If an ENTER PM SMART command is received during the initialization state S1, the channel unit transitions to a performance monitoring wait mode state S6.

The second state S2 is an interim state, to which the channel unit transitions from state S1. If the disable lead is reasserted active during state S2, the channel unit transitions back to the continuous initialization state S1. When the channel unit enters state S2, an initialization softimer is invoked. This initialization softimer has a prescribed default time-out interval, that provides sufficient time for a SMART channel unit to transmit an initialization request message INIT REQUEST to the SMART LIU and receive a SMART MODE response back message from the SMART LIU. Such a response message may correspond to an INIT COMMAND or a TIME SYNC COMMAND marker that is broadcast to all channel units in the bank, and is used to restart each initialization softimer. When restarted, the time-out interval of the initialization softimer is increased.

If the initialization softimer count downs to zero without the channel unit receiving a SMART mode command message from the LIU, it is inferred that the channel unit is to operate in the normal or non-performance monitoring mode, associated with a third state S3. This normal mode of operation could be based upon the fact that one or both of the channel unit and line interface unit are non PM capable devices or suffer from an operational anomaly preventing them from operating in the SMART mode. If an ENTER PM SMART message is received from the LIU during the second state, the SMART channel unit transitions to a SMART MODE state S5.

Once it has transitioned to state S3, the channel unit will transmit data to the customer in a normal manner, and wait for the disable lead to be asserted active, and not attempt to conduct SMART mode establishment communications. In response to the RNDIS lead going active, the channel unit transitions from the non-performance state S3 back to the continuous initialization state S1.

When the channel unit enters the SMART mode state S5 from state S2, it conducts SMART mode performance command and response messages with the SMART LIU by way of the overspeeded RNPCM data bus, with PCM data being transmitted to the customer. A non-smart channel unit cannot transition to state S5. When a SMART mode COMMAND message is received, a smart mode softimer is invoked. If its time-out period expires of this before another SMART mode COMMAND message from the SMART LIU is received, the channel unit will transition to a state S4.

If the disable lead is asserted active during the smart mode state, indicating an anomaly or alarm condition, the SMART channel unit transitions to a performance monitoring wait mode state S6. If an EXIT PM SMART NORMAL MODE command is received from the LIU, the channel unit transitions from the SMART MODE of state S5 to the normal mode state S3, so as to allow the SMART LIU, in response to detecting an erroneous operational condition in the bank, to place all SMART channel units in the normal mode, and allow data transmission to continue without effective interruption of customer communications.

The state S4 is a SMART mode retry state, to which a SMART channel unit transitions from the SMART mode state S5, if the smart mode softimer time-out period expires after receipt of a SMART mode command message from the LIU. Once a channel unit enters state S4, it is in a continuous SMART MODE message exchange retry condition, asserting an INIT REQUEST message. The state S4 permits repeated SMART mode retries. Once the channel unit has transitioned to state S4, it looks for a SMART mode command message to be received from the LIU. Receipt of such a SMART mode command message from the LIU causes the channel unit to transition from state S4 back to state S5. If the RNDIS is asserted active while the SMART channel unit is in state S4, the channel unit transitions back to the initialization state S1.

The state S6 is a performance monitoring wait state to which a SMART channel unit transitions in response to a SMART MODE COMMAND message in state S1, or in response to the RNDIS lead being asserted active when the channel unit is in the SMART MODE state S5. This latter condition could occur if a T1 communication link is in alarm or if the LIU has been removed. In the wait state S6, there is no time out; the SMART channel unit waits until the RNDIS lead is no longer asserted active, before transitioning to a further interim state S7 for returning to state S5 or state S1. During the wait state S6, the SMART channel unit may communicate with the LIU.

The interim state S7 is employed to determine whether the LIU has been removed from the D4 bank and replaced, or whether a T1 receive failure alarm has occurred. If the LIU has removed and replaced, then upon powering up it has no knowledge of the configuration or status of the bank, so that the replaced LIU will not initially conduct SMART MODE communications with any channel unit. The state S7 provides a return path to state S1 or to state S5. When the disable lead is de-asserted in state S6, a SMART LIU will transmit a TIME SYNC COMMAND message to all SMART channel units within the bank within a further, relatively short softimer interval. However, for a replaced LIU, no such TIME SYNC COMMAND message will generated by the LIU, and the channel unit will transition back to state S1. Namely, the failure to receive a TIME SYNC COMMAND message from the LIU before the relatively short (five second) time out of the T1 softimer provides an immediate return to state S1. The failure could be the result of a replacement of the LIU with another SMART LIU which is in the process of initializing, or the LIU could have been replaced with a non SMART LIU, in which case no SMART mode communications are possible, so that all channel units will transition to state S1 and transition therefrom to state S2 and then to state S3 in which normal mode communications are conducted.

The communication format of the various SMART MODE messages exchanged between the LIU and a channel unit employs a prescribed message delimiter byte (F0)$_{HEX}$, to locate or delimit the beginning and end of a message. If the original contents of a message contains the delimiter byte (F0)$_{HEX}$, a replacement sequence is transmitted in its place. Mapping between the delimiter byte and its replacement sequence is such that, prior to transmission, wherever the delimiter byte (F0)$_{HEX}$ appears in the original data, it is mapped into the two byte sequence (F1 00)$_{HEX}$. In order to prevent the F1$_{HEX}$ byte in the mapped two byte sequence (F1 00)$_{HEX}$ from being read as a true F1$_{HEX}$ byte, a true F1$_{HEX}$ data byte is mapped into the two byte sequence (F1 00)$_{HEX}$. At the receiver, the two byte sequence (F1 00)$_{HEX}$ is translated to the byte F0$_{HEX}$, and the two byte sequence (F1 01)$_{HEX}$ is translated to the byte F1$_{HEX}$.

DETAILED DESCRIPTION

Before describing in detail the mechanism for controlling the initialization and performance monitoring modes of operation of an enhanced or SMART D4 channel bank in accordance with the present invention, it should be observed that the invention resides in an augmentation of the communications control software employed in the upgraded channel bank architecture described in the above-referenced '288 application, so as to permit its supervisory performance monitoring controller to selectively place the intrabank communications link in a SMART MODE communication status and, once the SMART MODE has been established, to exchange DS0 loop-performance command and response messages with DS0 channel units on a selective basis. The circuitry of each the SMART line interface unit and the SMART channel unit architectures remains as shown and described in the above-referenced '288 application.

Figure 11:
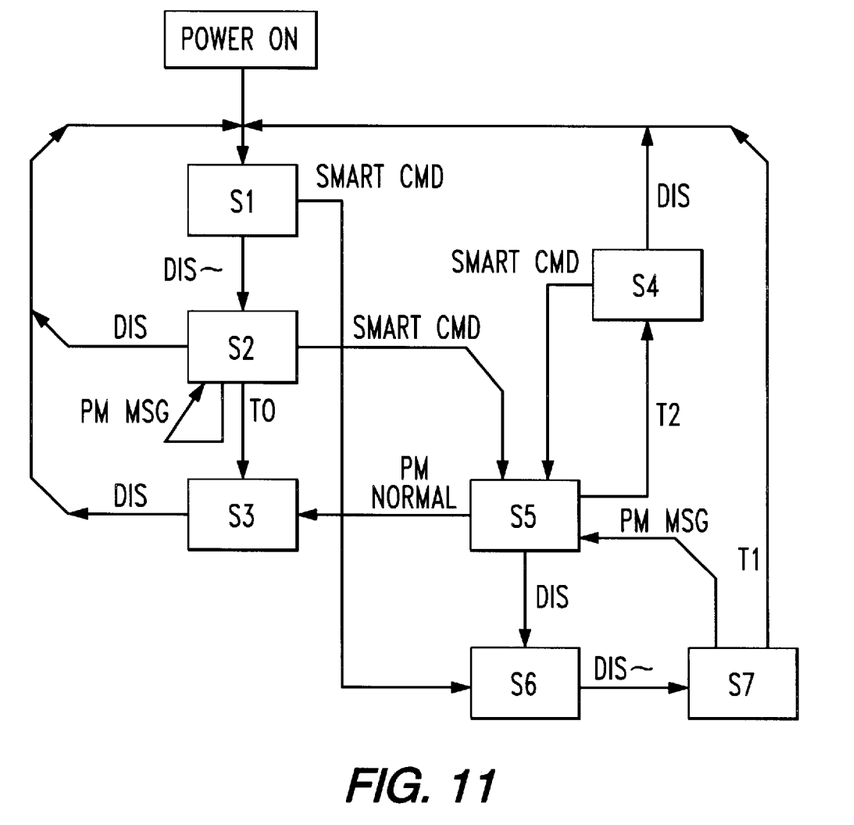
FIG. 11 is a channel unit state transition diagram according to the present invention for controlling the operation of a SMART channel unit described in the above-referenced '288 application.

To facilitate an appreciation of the enhanced SMART MODE initialization and performance monitoring mode control mechanism according to the present invention, attention is initially directed to the channel unit state transition diagram of FIG. 11, which diagrammatically illustrates various states S1–S7, among which the SMART channel unit may transition in the course of its being initialized, after installation or power-up from an unpowered or anomaly condition, to a command and response performance monitoring message dialogue with a SMART LIU, that supervises the operation of the operation of the channel bank.

STATE S1 (CONTINUOUS INITIALIZATION STATE)

The first state S1 corresponds to a continuous initialization condition, in which a performance monitoring-capable or SMART channel unit is placed when installed in a D4 bank and powered up, or powered up from a previously off mode. This differs from a conventional bank architecture, where a channel unit begins transmitting data immediately after being installed. Because the bus architecture of a performance monitoring capable channel bank employs the modified bus communication protocol of FIG. 4, it is initially necessary to determine the type of channel unit and line interface unit installed in the bank.

For this purpose, as will be described below with reference to the mode establishment diagram of FIG. 12, when the channel unit enters state S1 (either from a powered up condition, or from one of the return paths of the state diagram, to be described), it begins transmission of an INIT REQUEST message over the TDATA link 45 portion of the intrabank communication link 15. During this state S1, appropriate multiplexer out-of-sync or trunk conditioning codes, rather than backplane data, are transmitted toward the customer premises end of the DS0 loop.

The channel unit backplane also includes a disable lead RNDIS which, when asserted active, for example in the event of a bank anomaly such as a momentary power disruption, disables the operation of a channel unit. Once the anomaly clears and the bank comes back up, the RNDIS lead initially defaults to an alarm condition, in which the RNDIS lead is asserted active. When the fault condition clears, the LIU changes the state of the RNDIS lead, so as to allow the channel units to resume normal operation. Similarly, if a channel unit is plugged into the channel bank during an alarm condition, the channel unit will not be enabled until the alarm condition has cleared and the LIU has asserted the RNDIS lead inactive. Once the RNDIS lead has been asserted inactive by the LIU, the channel unit transitions from the continuous initialization state to a performance monitoring decision state S2. If an ENTER PM SMART command is received during state S1, the channel unit transitions to a performance monitoring wait mode state S6.

STATE S2 (PERFORMANCE MONITORING (SMART) DECISION STATE)

Figure 12:
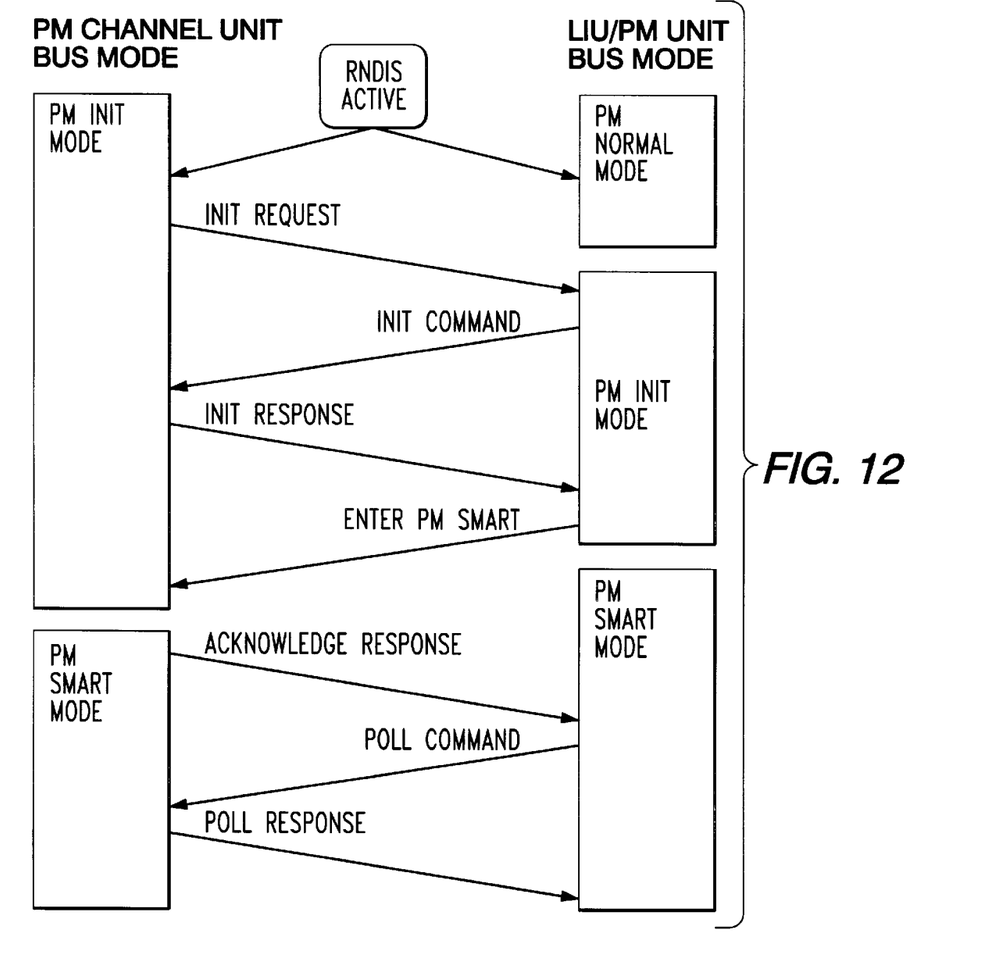
FIG. 12 is a mode establishment diagram showing the sequence of initialization and performance monitoring message exchanges between a SMART channel unit and a SMART LIU based upon the state transition diagram of FIG. 11.

The second or PM decision state S2 is an interim state, to which the channel unit transitions from state S1 in the course of execution of the mode establishment sequence of FIG. 12. It may be noted here that there is no effective difference between an alarm condition and a missing LIU, so that the backplane's RNDIS lead will be asserted active for as long as a condition equivalent to an alarm condition exists. Once the alarm condition disappears, however, and the RNDIS lead is rendered inactive, the channel unit transitions to state S2. As in state S1, during state S2 appropriate multiplexer out-of-sync or trunk conditioning codes, rather than backplane data, are transmitted toward the customer premises end of the DS0 loop. Should the RNDIS lead be reasserted active during state S2, the channel unit transitions back or returns to the continuous initialization state S1.

Figure 13:
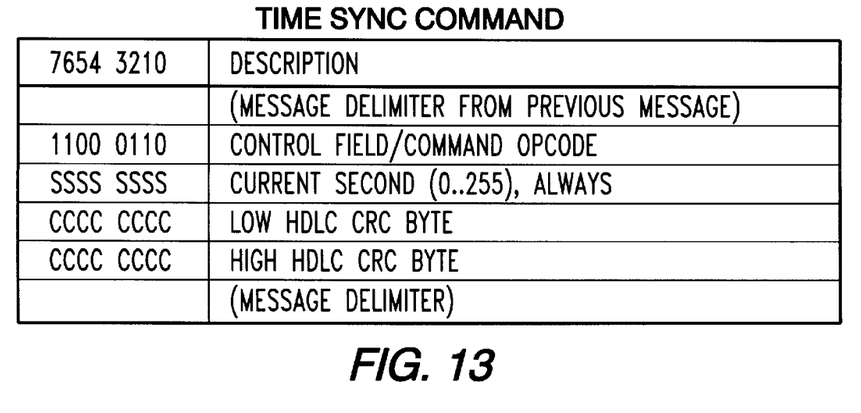
FIG. 13 illustrates the format of a TIME SYNC COMMAND message.

Whenever the channel unit enters state S2 (in response to the RNDIS lead going inactive), an initialization softimer T0 is invoked. Initially, the T0 softimer has a ten second default time-out interval, that provides sufficient time for a SMART channel unit to transmit an initialization request message (INIT REQUEST, formatted as shown in FIG. 6) to the SMART LIU and receive a smart mode-related response back message from the SMART LIU. While such a response message from a SMART LIU may correspond to an INIT COMMAND (formatted as shown in FIG. 7), it typically would be a TIME SYNC COMMAND marker (the format of which is shown in FIG. 13, to be described) that is broadcast to all channel units in the bank, and is used to reinitiate each T0 softimer, as shown by the loop 'PM msg'. When so restarted, the time-out interval of the T0 softimer is increased (e.g., to twenty seconds). Since a channel bank may contain up to forty-eight channel units, the time required for the LIU to respond to initialization requests from more than one channel unit may be longer than ten seconds. The assertion of the TIME SYNC COMMAND marker in the LIU command bit position of the INITIALIZATION MODE format of the bus will allow for this condition, without causing a SMART channel unit to transition to a non-performance or normal mode state S3, to be described.

If the initialization softimer T0 count downs to zero without the channel unit receiving any performance monitoring or SMART mode command message from the LIU, then it is inferred that this particular channel unit and the line interface unit are not currently capable of operating in the SMART mode, and the channel unit is to operate in the normal or non-performance monitoring mode (state S3). This normal or non-smart mode of operation could be based upon the fact that one or both of the channel unit and line interface unit are non PM capable devices or suffer from an operational anomaly preventing them from operating in the SMART mode. If an ENTER PM SMART message (FIG. 9) is received from the LIU during state S2 (the expected response from a smart LIU to an INIT RESPONSE message), the channel unit transitions to the SMART MODE state S5.

STATE S3 (NON-PERFORMANCE (NORMAL) MODE)

As pointed out above, if, during the performance monitoring decision state S2, the initialization softimer T0 counts down to zero without the channel unit receiving any performance monitoring message from the LIU, then it is inferred that either the channel unit, the line interface unit, or both are not currently capable of operating in the SMART mode. This condition could be based upon an alarm condition (e.g., a T1 alarm), for which the RNDIS lead is asserted active, or the LIU has been replaced with a non-smart LIU, for example. Regardless of the condition giving rise to the channel unit transitioning to state S3 (either from state S2 or from state S5, as will be described), the channel unit is to operate in the normal mode; any data on the backplane is transmitted to the customer premises without overspeeding the RNPCM bus. Once it has transitioned to state S3, the channel unit will simply wait for the RNDIS lead to be asserted active, not attempting to conduct any SMART mode establishment communications. In response to the RNDIS lead going active, the channel unit transitions from the non-performance state S3 back to the continuous initialization state S1.

STATE S4 (SMART MODE RETRY STATE)

State S4 is a SMART mode retry state, to which a SMART channel unit transitions from the SMART mode state S5, if a smart mode T2 softimer time-out period expires after receipt of a SMART mode command message from the LIU, as will be described. Once a channel unit enters state S4, it is in a continuous SMART MODE message exchange retry condition, asserting an INIT REQUEST message on the TDATA lead 45 to the LIU. Namely, the S4 state permits repeated SMART mode retries, since the LIU is a SMART LIU, having previously conducted the SMART mode initialization message exchange sequence of FIG. 12 with the SMART channel unit, in order for the SMART channel unit to have been placed in the SMART mode state S5. Otherwise, the RNDIS lead would be asserted active. Once the channel unit has transitioned to state S4, it looks for a SMART mode command message to be received from the LIU. Receipt of such a SMART mode command message from the LIU causes the channel unit to transition from state S4 back to state S5. If the RNDIS is asserted active while the SMART channel unit is in state S4, the channel unit transitions back to initialization state S1.

STATE S5 (SMART MODE)

State S5 is the channel unit SMART mode state, which is entered from state S2, described above, and during which a SMART channel unit conducts SMART mode performance command and response messages with the SMART LIU by way of the overspeeded RNPCM data bus, with PCM data being transmitted to the customer. A non-smart channel unit cannot transition to state S5. As explained with reference to state S4, whenever a SMART mode COMMAND message is received, the twenty-five second softimer T2 is invoked. If this time-out period expires before another SMART mode COMMAND message from the SMART LIU is received, the channel unit will transition to state S4, described above.

If the RNDIS lead is asserted active during the state S5, indicating an anomaly or alarm condition, the SMART channel unit transitions to a performance monitoring wait mode state S6, to be described. If an EXIT PM SMART NORMAL MODE command (to be described below with reference to FIG. 14) is received from the LIU, the channel unit transitions from the SMART MODE of state S5 to the normal mode state S3, described above. This allows the SMART LIU, in response to detecting an erroneous operational condition in the bank, to place all SMART channel units in the normal mode, to allow data transmission to continue without effective interruption of customer communications.

STATE S6 (PERFORMANCE-MONITORING WAIT MODE)

State S6 is a performance monitoring wait state to which a SMART channel unit transitions, in response to a SMART MODE COMMAND message in state S1, or in response to the RNDIS lead being asserted active when the channel unit is in the SMART MODE state S5. This latter condition could occur if the T1 link is in alarm or if the LIU has been removed. In the wait state S6, there is no time out, as in other states, simply because of the presence of an alarm condition. In state S6, the SMART channel unit waits until the RNDIS lead is no longer asserted active, before transitioning to a further interim state S7 for returning to state S5 or state S1. During wait state S6, the SMART channel unit may communicate with the LIU, for example for the case of a yellow alarm condition, as described in the above-referenced '288 application.

STATE S7 (INTERIM STATE)

State S7 is employed to determine whether the LIU has been removed from the D4 bank and replaced, or whether a T1 receive failure alarm has occurred. If the LIU has removed and replaced, then when it powers up it has no knowledge of the configuration or status of the bank. As a result, the replaced LIU will not initially conduct SMART MODE communications with any channel unit. In effect, state S7 provides a quick exit to state S1, or a return to state S5. Normally, upon the RNDIS lead being asserted inactive in state S6, a SMART LIU will transmit a time sync command message (TIME SYNC COMMAND) to all SMART channel units within the bank within a prescribed T1 softimer interval (e.g. five seconds), denoted as a PM msg from state S7 to smart mode state S5 in FIG. 11. However, for the case of a replaced LIU, no such five second TIME SYNC COMMAND message will generated by the LIU, so that the channel unit will transition back to state S1. Namely, the failure to receive a TIME SYNC COMMAND message from the LIU before the relatively short (five second) time out of the T1 softimer provides an immediate return to state S1. The failure could be the result of a replacement of the LIU with another SMART LIU which is in the process of initializing, or the LIU could have been replaced with a non SMART LIU, in which case no SMART mode communications are possible, so that all channel units will transition to state S1 and transition therefrom to state S2 and then to state S3 in which normal mode operation is performed.

INITIALIZATION—SMART MODE MESSAGE EXCHANGE SEQUENCE

FIG. 12 diagrammatically illustrates the sequence of message exchanges that are carried out between a smart, performance monitoring-capable or SMART LIU and a SMART channel unit that are programmed to execute the state transition diagram of FIG. 11. The sequence diagrammatically illustrated in FIG. 12 and described below is similar to that diagrammatically illustrated in FIG. 5, but takes into account the state of the channel bank's backplane RNDIS lead and the softimers described above.

As described in the '288 application and as reiterated briefly above, when a SMART channel unit is installed in the channel bank, the SMART channel unit executes a sequence of initialization mode operations associated with a performance monitoring initialization mode (PM INIT MODE). Upon being powered up into the initialization state (state S1 in FIG. 11), and with the RNDIS lead cleared or deactivated, the channel unit proceeds to transmit an INIT REQUEST message (FIG. 6) message over the TDATA bus 45 to the LIU 12. This INIT REQUEST message is repeatedly asserted on the TDATA bus for the prescribed T0 time-out interval. Upon expiration of the T0 time out, with the channel unit transitioning to state S3, it is inferred that the LIU is a non-smart unit and transmission of the INIT REQUEST message is terminated.

The transmit unit 35 of the channel bank couples each INIT REQUEST message over the TPCM lead 51 to the SMART LIU, which continuously scans successive channel unit timeslots for an in-band INIT REQUEST message being transmitted by a SMART channel unit. Upon detecting an INIT REQUEST message, the SMART LIU modifies the normal data format for that timeslot TSi on the RNPCM lead to the enhanced RNPCM INIT format shown in FIG. 4. The SMART LIU uses the Crx bit position to transmit two messages at initialization—an INIT COMMAND message (FIG. 7) and a TIME SYNC COMMAND message (FIG. 13), on the RNPCM bus 61 to the channel unit that has sourced the INIT REQUEST message.

If the INIT COMMAND message is garbled, the SMART LIU may use the TIME SYNC COMMAND message (FIG. 13) to indicate that the SMART mode will be activated, and reset the T0 softimer of state S2, referenced above. Any performance monitoring message may replace this second message. As shown in FIG. 13, a TIME SYNC COMMAND message comprises the message delimiter (F0$_{HEX}$), followed by a control field/command opcode C6$_{HEX}$, a current second value code, a pair of HDLC CRC bytes and a terminating message delimiter byte F0$_{HEX}$.

After it has asserted an INIT REQUEST message to the LIU on the TDATA lead 45, the SMART channel unit monitors the RNPCM bus and samples the Crx bit position of the RNPCM INIT format of the RNPCM bus for the return of the INIT COMMAND message from the SMART LIU. Upon receipt of the INIT COMMAND message from the SMART LIU, the SMART channel unit assembles an INIT RESPONSE message which is asserted onto the TDATA bus to the SMART LIU.

Transmission of an INIT RESPONSE message begins within a predetermined time after receipt of the INIT COMMAND message from the LIU and is repeated for a prescribed interval (e.g. one second) or until an ENTER PM SMART command message is received from the SMART LIU. As described in the '288 application, an INIT RESPONSE message corresponds to the same thirty-two bit information field contained within the INIT COMMAND message transmitted by the LIU. This mirroring back of the information field in the INIT COMMAND message to the LIU enables the LIU to verify that the destination channel unit is co-located in the same D4 channel bank as the LIU.

After asserting an INIT COMMAND message on the RNPCM bus 61, the LIU monitors the TPCM lead 51 from the channel bank's transmit unit 35 for an INIT RESPONSE message that has been asserted onto the TDATA bus 45 by the SMART channel unit. The SMART LIU examines the contents of the INIT RESPONSE message for the presence of the same thirty-two bit information field contained within the INIT COMMAND message originally transmitted by the LIU, to verify that the channel unit is co-located in the same D4 channel bank as the LIU. If the INIT RESPONSE message by the SMART LIU is not detected within a prescribed time interval (e.g. 100 milliseconds) after it has transmitted the INIT COMMAND message, the LIU infers that the channel unit is not a SMART channel unit and proceeds to configure the time slot of interest to normal RNPCM mode and scans the next timeslot. If the proper INIT RESPONSE message has been returned by the channel unit, the LIU asserts an ENTER PM SMART mode command message (FIG. 9) onto the RNPCM bus 61.

After it has asserted an INIT RESPONSE message (FIG. 8) to the LIU on the TDATA lead, the SMART channel unit monitors the RNPCM bus 61 and samples the Crx bit position of the RNPCM INIT format of the bus for the return of the ENTER PM SMART message from the SMART LIU. Upon receipt of the ENTER PM SMART command message from the SMART LIU, the SMART channel unit transitions to the SMART MODE (state S5 in FIG. 11).

When transitioning to the SMART MODE of state S5, the SMART channel unit proceeds to reconfigure the TDATA bus 45 for the normal data format, and also asserts an ACKNOWLEDGE RESPONSE message (FIG. 10) onto the RNPCM bus 61, using the bit position customarily occupied by the b3 bit of a normal data format to assert a Ctx bit on the RNPCM bus 61. Once an ACKNOWLEDGE RESPONSE message has been asserted onto the RNPCM bus 61 by the channel unit, so that both the LIU and the channel unit are now configured for SMART mode message exchanges in state S5, the SMART LIU proceeds to conduct asynchronous command and response message communications with the channel unit, using the RNPCM SMART data format of FIG. 4.

As pointed out above with reference to the state transition diagram of FIG. 11, during the PM SMART mode of operation, if the SMART channel unit does not receive a SMART mode command message from the LIU prior to expiration of the T2 softimer, the channel unit transitions to state S4. Each time a valid SMART mode COMMAND packet is received, the T2 softimer is reset.

Whenever the RNDIS lead is de-asserted on the channel bank's backplane, the SMART LIU will transmit the TIME SYNC COMMAND message to all channel timeslots on the seventh, eighth, ninth and tenth seconds after the RNDIS lead is cleared, and every five seconds afterward until a predetermined time period (e.g. 60 seconds) has elapsed. This allows the SMART channel units which are expecting to be configured within the ten second T0 softimer interval after the RNDIS lead has been de-asserted to be extended to the twenty second duration, described above.

The SMART LIU also asserts a TIME SYNC COMMAND message during SMART channel timeslots in the second, third and fourth seconds after the RNDIS lead is de-asserted on the channel bank's backplane, so as to allow channel units which have been pre-configured during the time that the RNDIS lead has been active from an unpowered condition, or are already configured as SMART channel units and have not been able to communicate during an alarm condition, to remain in the SMART mode.

As pointed out above, the five second time-out for TIME SYNC COMMAND messages in interim state S7 provides a quick exit to state S1. In response to the RNDIS lead being asserted inactive in state S6, a SMART LIU will transmit a TIME SYNC COMMAND message to all SMART channel units within the bank within a prescribed T1 softimer interval (e.g. five seconds), denoted as a PM msg from state S7 to smart mode state S5 in FIG. 11. However, for a replaced LIU, the five second TIME SYNC COMMAND message will generated by the LIU, so that the channel unit will transition to state S1.

Thus, the failure to receive a TIME SYNC COMMAND message before the relatively short (five second) time out from the LIU provides an immediate return to state S1. As noted earlier, the failure could be the result of a replacement of the LIU with another SMART LIU which is in the process of initializing, or the LIU could have been replaced with a non SMART LIU, in which case no SMART mode communications are possible, so that all channel units will transition to state S1 and transition therefrom to state S2 and then to state S3 in which normal mode operation is performed.

Figure 14:
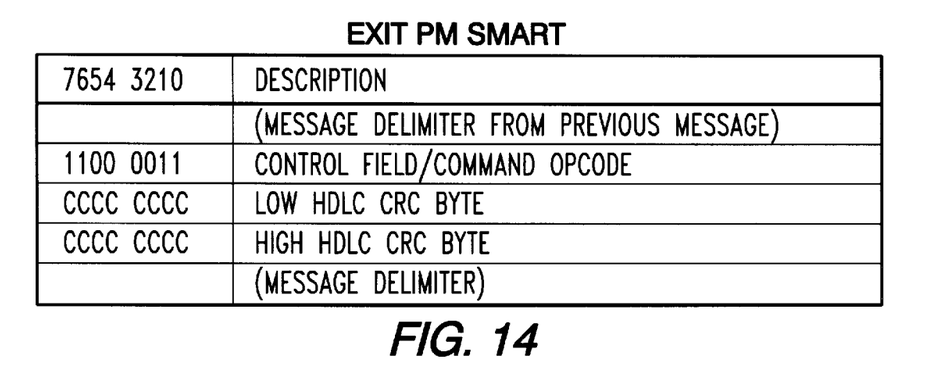
FIG. 14 shows the format of an EXIT PM SMART NORMAL MODE command message.

In addition, if an EXIT PM SMART NORMAL MODE command (formatted as shown in FIG. 14) is received from the LIU, the channel unit transitions from the SMART MODE of state S5 to the normal mode state S3, described above. This allows the SMART LIU, in response to detecting an erroneous operational condition in the bank, to place all SMART channel units in the normal mode, to allow data transmission to continue without effectively interrupting customer communications.

As pointed out above, the communication format of the various SMART MODE messages exchanged between the LIU and a channel unit employs a prescribed message delimiter byte (F0)$_{HEX}$, to locate the beginning and end of a message. Namely, the delimiter byte (F0)$_{HEX}$ is transmitted only between messages, not as part of an actual message. As a consequence, if the original contents of a to-be-transmitted message contains the delimiter byte (F0)$_{HEX}$, a replacement sequence is transmitted in its place (after calculating the appended CRC sequence).

Figure 15:
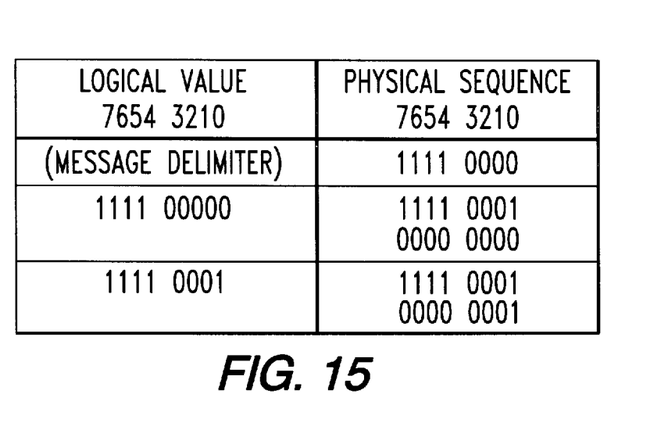
FIG. 15 show a mapping translation scheme through which a message delimiter byte (F0)$_{HEX}$ is mapped into a two byte replacement sequence.

Mapping between the delimiter byte and its replacement sequence is diagrammatically illustrated in FIG. 15. Wherever the delimiter byte (F0)$_{HEX}$ appears in the data, it is mapped into the two byte sequence (F1 00)$_{HEX}$. In order to prevent the F1$_{HEX}$ byte in the mapped two byte sequence (F1 00)$_{HEX}$ from being read as a true F1$_{HEX}$ byte, a true F1$_{HEX}$ data byte is mapped into the two byte sequence (F1 00)$_{HEX}$. At the receiver, the two byte sequence (F1 $^{00}$)HEX is first translated to the byte F0$_{HEX}$, and the two byte sequence (F1 01)$_{HEX}$ is first translated to the byte F1$_{HEX}$, prior to calculating the CRC sequence. Thus, whenever the receiver sees the byte F0$_{HEX}$, it knows that it has received a delimiter byte.

As will be appreciated from the foregoing description, the communications control software employed in the upgraded channel bank architecture described in the above-referenced '288 application is configured in accordance with the present invention to execute a channel unit state transition routine, through which a supervisory performance monitoring controller SMART LIU selectively places the intrabank communications link in a SMART MODE communication status and, once the SMART MODE has been established, exchanges DS0 loop-performance command and response messages with SMART channel units on a selective basis. The circuitry of each the SMART LIU and A SMART channel unit architectures remains as shown and described in the above-referenced '288 application.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. For use with a telephone communication network having a channel bank containing a line interface unit, which interfaces digital communication signals with respect to a first site, and a plurality of channel units coupled to said line interface unit by way of a bidirectional communication bus therebetween, a respective channel unit being operative to transmit digital communication signals over a communication link to a digital communications network interface at a customer site, and to transmit digital communication signals, that have been conveyed thereto from said digital communications network interface, to said line interface by way of said bidirectional communication bus, a method of controlling the operation of said channel bank by way of said bidirectional communications bus comprising the steps of:

(a) placing a respective channel unit in an initialization state, during which said channel unit, if capable of monitoring a performance parameter of said communication link to said digital communications network interface at said customer site, transmits a first message to said line interface unit requesting said line interface unit to conduct a message exchange with said channel unit that would place said channel unit in a performance-monitoring mode of operation with said line interface unit;

(b) in response to an indication that there is no anomaly that would impair the operation of said channel bank, causing said channel unit to transition from said initialization state to a performance-monitoring decision state;

(c) in response to receipt of a command message from said line interface unit to enter a performance-monitoring mode of operation, within a first prescribed period of time upon entering said performance-monitoring decision state, and in response to said channel unit being capable of monitoring a performance parameter of said communication link to said digital communications network interface at said customer site, causing said channel unit to transition to a performance monitoring mode of operation, during which said channel unit and said line interface unit exchange performance-monitoring command and response messages; and (d) in the absence of receipt of a command message from said line interface unit to enter a performance monitoring mode of operation within said first prescribed period of time upon entering said performance-monitoring decision state, causing said channel unit to transition to a normal mode of operation, during which said channel unit transmits data over said communication link to said customer site without exchanging performance-monitoring command and response messages with said line interface unit.

2. A method according to claim 1, further including the step of:

(e) after said channel unit has transitioned to said performance monitoring mode of operation, and in response to the lack of receipt of a further command message from said line interface unit within a second prescribed period of time after receipt of a command message, causing said channel unit to transition to a performance monitoring retry state, during which said channel unit transmits said first message to said line interface unit requesting said line interface unit to conduct a message exchange with said channel unit that would place said channel unit in a performance-monitoring mode of operation with said line interface unit.

3. A method according to claim 2, wherein step (e) further includes, in response to an indication of an anomaly that would impair the operation of said channel bank, causing said channel unit to transition from said performance-monitoring retry state to said initialization state.

4. A method according to claim 2, wherein step (e) further includes, in response said line interface unit conducting a message exchange with said channel unit to place said channel unit in a performance-monitoring mode of operation with said line interface unit, causing said channel unit to re-enter said performance-monitoring mode of operation.

5. A method according to claim 1, further including the step of:

(e) after said channel unit has transitioned to said performance monitoring mode of operation, and in response to receipt of a command message from said line interface unit instructing said channel unit to transition to said normal mode of operation, causing said channel unit to transition to said normal mode of operation, during which said channel unit transmits data over said communication link to said customer site without exchanging performance-monitoring command and response messages with said line interface unit.

6. A method according to claim 1, wherein step (d) further includes, in response to an indication of an anomaly that would impair the operation of said channel bank, causing said channel unit to transition from said normal mode of operation to said initialization state.

7. A method according to claim 1, further including the steps of:

(e) after said channel unit has transitioned to said performance monitoring mode of operation, and in response to an indication of an anomaly that would impair the operation of said channel bank, causing said channel unit to transition from said performance-monitoring mode of operation to a performance monitoring wait mode state;

(f) after said channel unit has transitioned to said performance-monitoring wait state, in response to an indication that there is no anomaly that would impair the operation of said channel bank, causing said channel unit to transition from said performance-monitoring wait state to an interim state; and (g) in response to receipt of a prescribed timing message from said line interface unit within a third prescribed period of time after said channel unit has transitioned to said interim state from said performance-monitoring wait state, causing said channel unit to transition from said interim state to said performance-monitoring mode of operation, but otherwise causing said channel unit to transition from said interim state to said initialization state.

8. A method according to claim 1, wherein step (c) further comprises, in response to receipt of a prescribed timing message from said line interface unit within said first prescribed period of time after said channel unit has transitioned from said initialization state to said performance-monitoring decision state, increasing the duration of said first prescribed period of time.

9. A method according to claim 1, wherein step (d) further includes, in response to an indication of an anomaly that would impair the operation of said channel bank, causing said channel unit to transition from said normal mode of operation to said initialization state.

10. A method according to claim 1, wherein digital communication messages conveyed over said bidirectional communication bus between said line interface unit and said channel unit employ a prescribed digital code as a communication control code, and wherein digital data contained in messages transmitted over said bidirectional communication bus is encoded in a manner which prevents any portion of said digital data containing said prescribed digital code from being interpreted as said communication control code.

11. A method according to claim 10, digital data contained in messages transmitted over said bidirectional communication bus is encoded to prevent any portion of said digital data containing said prescribed digital code from being interpreted as said communication control code by performing the steps of:

(i) monitoring digital data to be conveyed over said bidirectional communication bus for the presence of said prescribed digital code;

(ii) in response to step (i) detecting that contents of said digital data to be conveyed over said bidirectional communication bus contains said prescribed digital code, replacing said contents of said digital data with another digital code different from said prescribed digital code and which is not valid digital data.

12. A method according to claim 11, wherein said another digital code has a length different from that of said prescribed digital code.

13. A method according to claim 12, wherein said another digital code is comprised of first and second digital codes of which valid digital data may be comprised.

14. A method according to claim 13, further comprising the steps of:

(iii) monitoring digital data to be conveyed over said bidirectional communication bus for the presence of said first digital code;

(iv) in response to step (iii) detecting that contents of said digital data to be conveyed over said bidirectional communication bus contains said first digital code, replacing said contents of said digital data with said first digital code and a third digital code of which valid digital data may be comprised.

15. A method according to claim 14, wherein said prescribed digital code comprises the digital code byte $(F0)_{HEX}$, which delimits the beginning or end of a digital communication message.

16. A method according to claim 15, wherein said first digital code is the digital code $F1_{HEX}$, said second digital code is the digital code $00_{HEX}$, and said third digital code is the digital code $01_{HEX}$.

17. For use with a telephone communication network having a channel bank containing a line interface unit, which interfaces digital communication signals with respect to a first site, and a plurality of channel units coupled to said line interface unit by way of a bidirectional communication bus therebetween, a respective channel unit being operative to transmit digital communication signals over a communication link to a digital communications network interface at a customer site, and to transmit digital communication signals, that have been conveyed thereto from said digital communications network interface, to said line interface by way of said bidirectional communication bus, a method of controlling the operation of said channel bank by way of said bidirectional communication bus comprising the steps of:

(a) causing a channel unit that has been installed in said channel bank to be placed in an initialization state, during which said channel unit, in the absence of an indication that there is an anomaly that would impair the operation of said channel bank, and if each of said line interface unit and said channel unit is capable of conducting performance-monitoring communications with one another, exchanges performance-monitoring mode transition messages with said line interface unit, such that said channel unit transitions to a performance-monitoring mode of operation for conducting performance-monitoring communications with said line interface unit; but (b) if either of said channel unit and said line interface unit is not capable of conducting performance-monitoring communications with one another, and in the absence of an indication that there is an anomaly that would impair the operation of said channel bank, causing said channel unit to transition to a normal mode of operation, during which said channel unit transmits data over said communication link to said customer site without exchanging performance-monitoring messages with said line interface unit.

18. A method according to claim 17, further including the step of:

(c) after said channel unit has transitioned to said performance-monitoring mode of operation, and in response to the lack of receipt of a performance-monitoring mode message from said line interface unit within a first prescribed period of time after transitioning to said performance-monitoring mode of operation, causing said channel unit to transition to a performance monitoring retry state, during which said channel unit requests said line interface unit to perform said performance-monitoring mode of operation with said line interface unit.

19. A method according to claim 18, wherein step (c) further includes, in response to an indication of an anomaly that would impair the operation of said channel bank, causing said channel unit to transition from said performance-monitoring retry state to said initialization state.

20. A method according to claim 18, wherein step (c) further includes, in response said line interface unit resuming communications with said channel unit, associated with said performance-monitoring mode of operation, causing said channel unit to re-enter said performance-monitoring mode of operation.

21. A method according to claim 17, further including the step of:

(c) in response to replacement of a performance-monitoring capable channel unit, that has been operating in said performance-monitoring mode of operation, with another channel unit not having performance-monitoring capability, causing said another channel unit to operate in said normal mode of operation.

22. A method according to claim 17, wherein step (b) further includes, in response to an indication of an anomaly that would impair the operation of said channel bank, causing said channel unit to transition from said normal mode of operation to said initialization state.

23. A method according to claim 17, further including the steps of:

(c) after said channel unit has transitioned in step (a) to said performance monitoring mode of operation, and in response to an indication of an anomaly that would impair the operation of said channel bank, causing said channel unit to transition from said performance-monitoring mode of operation to a performance monitoring wait mode state;

(d) after said channel unit has transitioned in step (c) to said performance-monitoring wait state, in response to an indication that there is no anomaly that would impair the operation of said channel bank, causing said channel unit to transition from said performance-monitoring wait state to an interim state; and (e) in response to receipt of a prescribed timing message from said line interface unit within a predetermined period of time after said channel unit has transitioned to said interim state from said performance-monitoring wait state, causing said channel unit to transition from said interim state to said performance-monitoring mode of operation, but otherwise causing said channel unit to transition from said interim state to said initialization state.

24. A method according to claim 23, wherein step (a) further comprises, in response to receipt of a prescribed timing message from said line interface unit within a time interval after said channel unit has transitioned from said initialization state to said performance-monitoring decision state, increasing the duration of said time interval.

25. A method according to claim 17, wherein step (a) further includes, in response to an indication of an anomaly that would impair the operation of said channel bank, causing said channel unit to transition from said normal mode of operation to said initialization state.

26. A method according to claim 17, wherein digital communication messages conveyed over said bidirectional communication bus between said line interface unit and said channel unit employ a prescribed digital code as a communication control code, and wherein digital data contained in messages transmitted over said bidirectional communication bus is encoded in a manner which prevents any portion of said digital data containing said prescribed digital code from being interpreted as said communication control code.

27. A method according to claim 26, digital data contained in messages transmitted over said bidirectional communication bus is encoded to prevent any portion of said digital data containing said prescribed digital code from being interpreted as said communication control code by performing the steps of:

(i) monitoring digital data to be conveyed over said bidirectional communication bus for the presence of said prescribed digital code;

(ii) in response to step (i) detecting that contents of said digital data to be conveyed over said bidirectional communication bus contains said prescribed digital code, replacing said contents of said digital data with another digital code different from said prescribed digital code and which is not valid digital data.

28. A method according to claim 17, wherein, during said initialization state, step (a) comprises modifying the data communication format of said bidirectional communication bus to provide for the insertion of an auxiliary command signal between selected portions of digital data communication signals, and transmitting command information from said line interface unit to said channel unit by way of said auxiliary command signal, and during said performance-monitoring mode of operation, modifying the communication format on said bidirectional communication bus to provide for the transmission of said digital data communication signals at a data rate that is increased relative to the normal data rate at which said digital data communication signals are transmitted, and transmitting a response message signal from said channel unit to said line interface unit during a time interval separate from that occupied by said increased data rate digital data communication signals.

29. A method according to claim 28, wherein step (a) further comprises modifying the communication format on said bidirectional communication bus, so as to shorten the duration of successive data bits of a data byte of which said digital data communication signals are comprised, to a reduced time interval that provides for the insertion of additional information bits within the remaining available portion of a normal data byte period, said additional information bits including a performance-monitoring command bit from said line interface unit to said channel unit and a performance-monitoring response bit from said channel unit to said line interface unit.

30. A method according to claim 29, wherein step (a) comprises modifying the communication format on said bidirectional communication bus, so as to effectively halve the duration of successive data bits of a data byte of which said digital communication signals are comprised, such that successive ones of compressed data bits and said command bit may be sampled by a respective successive edge of a sampling clock signal having a clock rate that is twice that of a normal data rate.

31. A method according to claim 17, wherein step (a) comprises controlling the format of digital data communications conveyed over said bidirectional communication bus so as to allow said line interface unit to convey command messages to said channel unit without interrupting the transmission of said digital data communication signals to said customer site.

32. A method according to claim 31, wherein step (a) comprises interleaving a command message signal from said line interface unit to said channel unit between selected successive ones of said digital data communication signals.

33. A method according to claim 17, wherein step (a) includes increasing the data rate of transmission of digital data communication signals over said bidirectional communication bus, and transmitting a response message signal from said channel unit to said line interface unit, during a time interval separate from that occupied by successive bits of a data byte of which increased data rate digital data communication signals are comprised.

* * * * *